Patented May 25, 1948

2,441,966

UNITED STATES PATENT OFFICE 2,441,966

DEHYDRATION PROCESS AND CATALYST

William J. Hale, Midland, Mich., assignor to National Agrol Company, Inc., Washington, D. C., a corporation of Delaware No Drawing. Application December 16, 1942, Serial No. 469,256

1 Claim. (Cl. 260—681)

This invention relates to a catalytic process and more especially to a process for dehydrating aliphatic glycols such as pinacol and related dihydric aliphatic glycols.

Hitherto, the dehydration of glycols has been accomplished by the action of various agents, but generally sulphuric acid and organic sulphonic acids in small quantities have been previously employed for this purpose. These prior processes have not been especially efficient because of the low yield and the production of undesirable by-products. For example, in the dehydration of pinacol by these methods, a substantial percentage of pinacolin is produced. Moreover, the time required for these processes is appreciably longer than that required by the present process.

One of the objects of this invention is to avoid the above mentioned disadvantages of the prior art.

Another object of the present invention is to provide a method of dehydrating dihydric aliphatic glycols, such as pinacol, by bringing it into contact with an especially prepared catalyst under controlled conditions.

A further object of this invention is to provide an especially prepared catalyst which is preferably used in this process of dehydration.

With these and other objects in view, which will be apparent from the subsequent description, this invention embraces broadly a process of dehydrating dihydric aliphatic glycols by contacting the selected glycol with an especially prepared catalyst; and also a catalyst which is preferably employed in this process and a method of making the same. The dehydration process is conducted at a raised temperature in the presence of water vapor and a nonreactive gas. Large yields of the desired product are obtained as a result of a single pass of the selected glycol over the catalyst and only an unappreciable percentage of by-products is produced. For example, the treatment of pinacol by this method has resulted in conversions to 2,3 dimethyl butadiene as high as 93% without the production of by-products.

The catalyst employed is in the form of pellets which pour freely and do not lose their original shape. The catalyst is stable under increased conditions of temperature and reduction, and can be used for prolonged periods without reactivation.

One form of the catalyst which may be employed is disclosed in the copending application by Harry Miller, Serial No. 303,168, filed November 6, 1939, now Patent 2,379,736. The improved form of this catalyst disclosed in the present application comprises a skeletal core of a base metal selected from the group consisting of beryllium, magnesium, zinc, cadmium, aluminum, thallium, tin, lead, bismuth, or related metals, which extends into the interstices of the non-sintered individual particles of an acidic oxide of a metal selected from Family A of either the fifth or sixth groups of the periodic system of the elements, notably vanadium, columbium, tantalum, chromium, molybdenum, tungsten, uranium.

In preparing the catalyst, the base metal which is to form the core and the selected acidic oxide are roasted at a temperature which is just sufficient to bring the base metal to a molten state, and thus permit its penetration into the interstices of the oxide particles to form a catalytic mass of non-sintered pellets which pour freely and do not lose their original shape. The selected base metal must have a lower melting point than the selected oxide to prevent sintering.

During the formation of this catalyst, the particles of the selected acidic oxide are partially reduced and at the same time the base metal forming the skeletal core is partially oxidized. As a result, a compound is formed by the reaction between the oxidized portion of this base metal and the acidic oxide, which compound in turn undergoes a certain degree of reduction by contact with the molten free base metal. A substantial portion of the metal of the skeletal core remains free however, and serves as a reduction reserve for the partially reduced acidic oxide.

Another catalyst which may be employed is disclosed in my copending application, Serial No. 436,028, filed March 24, 1942. This catalyst is similar to the one described above except that the skeletal core is composed of any alloy of two or more of the base metals which were previously mentioned. It has been found that the use of such an alloy enables rapid reduction of the selected acidic oxide at lower temperatures without danger of the skeletal core itself becoming completely oxidized. The use of these alloys, furthermore, insures a sufficient reductive reserve.

A third form of the catalyst is disclosed in copending application, Serial No. 451,320, which was filed July 17, 1942, by William J. Hale and Harry Miller, now abandoned. This catalyst may be similar in form to either of the catalysts previously discussed, but contains an additional ingredient which materially aids in preventing the complete reduction of the acidic oxide during the preparation of the catalyst. These agents are refractory oxides which react with the previously mentioned acidic oxides of Family A of the fifth and sixth groups of the periodic system to form polyacid anions which retain oxygen even when subjected to extremely rigorous conditions during the previously mentioned roasting and reduction steps. Among these refractory agents may be mentioned the oxides of boron, cerium and the rare earth metals, silicon, titanium, zirconium, thorium, and phosphorous. The use of these refractories eliminates the necessity of carefully controlling the temperature during the preparation of the catalyst to prevent complete reduction. Although the presence of these refractory oxides lengthens the life of the catalyst, occasions may arise in which their use is not primarily essential.

The preferred form of the catalyst is an improvement of any of the catalysts mentioned above. The skeletal core of base metal of this catalyst is built upon an inert carrier in order to increase the surface area and thereby present an extensive surface of highly active oxide. Among these inert substances may be mentioned pumice, carbon, carborundum, kaolin, infusorial earth, quartz and silica gel.

In preparing this catalyst, the inert carrier is coated with the selected base metal by being brought into contact with the metal in molten form. The particles coated with this metallic surface are then brought into contact with the selected acidic oxide and the selected refractory oxide, if one is employed, and the mass is roasted to form the catalyst in pellet form. These pellets pour freely and retain their original shape.

One of the methods of preparing the preferred catalyst is given in the following example:

Example 1

A 10-mesh granular carborundum is heated in a molten bath consisting of three parts aluminum and one part magnesium for two hours and then removed, cooled and weighed to determine the metallic content. A quantity of these pellets carrying 100 grams of the alloy is then brought into contact with one gram of refractory acidic oxide such as freshly precipitated silicic acid and 10 grams of powdered tungstic anhydride and the whole thoroughly triturated. The resulting granular mass is then roasted in the air at approximately 500° C. and finally reduced in an atmosphere of hydrogen at approximately 300° C. until the blue color of the reduced tungstic oxide is fully developed. This catalyst will occupy about 20 cubic inches.

Example 2

One hundred parts of 10 mesh granular aluminum is well triturated with one part freshly precipitated silicic acid, two parts tantalum pentoxide, and eight parts tungstic anhydride, after which the granular mass is brought to a temperature of approximately 600° C. for a few moments only, and then cooled and reduced in an atmosphere of hydrogen at approximately 300° C., when it is ready to use.

Whichever type catalyst is selected, the dehydrative process is useful in the dehydration of dihydric aliphatic glycols, especially pinacol, and related glycols such as trimethyl ethylene glycol. In practicing the process the vapors of the selected glycol are brought into contact with the catalyst in the presence of water vapor and an inert gas. The presence of sufficient water in the form of vapor is desirable to replace the tendency towards intra-dehydration of adjacent hydroxyl groups. Usually it is desirable to dilute the vapors of glycol with from 15 to 25% of water vapor by volume for this purpose.

This mixture is further diluted with from 1 to 5 times its volume of a nonreactive gas such as carbon dioxide, carbon monoxide, methane, hydrogen, ammonia, the amides or imides just before passage of the vapors over the selected dehydrative catalyst. Reactive gases such as free oxygen or nitrogen should not be permitted within the reaction zone as their presence does not favor the formation of the desired unsaturated carbon compounds. For example, the presence of nitrogen has been found to be undesirable because of nitride formation.

The temperature of the reaction should be maintained at as low a point as possible. Generally a range between 200 and 250° C. has been found to be preferable, the optimum temperature within this range depending upon the glycol which is selected.

It will be found that this improved process brings about dehydration with the greatest ease, and a high percentage of conversion in the initial step. This high percentage of conversion, with practically complete absence of by-products and use of relatively low temperatures is brought out in the following examples:

Example 3

Into an ordinary combustion tube of about ⅞ inch internal diameter 50 grams of the catalyst, prepared as described in Example 1, was introduced and found to fill over ten inches of tube length. The temperature of catalytic mass was now maintained at approximately 200° C. The vapors of 10 grams of pinacol admixed with about 2 grams of water vapor together with about 5 cc. of an inert gas, such as carbon dioxide, were now passed through the tube within the span of 20 minutes. There resulted 6.3 grams of 2,3-dimethyl butadiene (B. P. 71°) corresponding to a 93% conversion in one pass, with only 1 gram of pinacol left unacted upon.

Example 4

In an apparatus setup as in Example 3 and with an equal amount of same catalyst contained within the combustion tube, there was now passed over the catalyst, maintained at about 220° C., 10 grams of the vapor of 2 methyl butane diol-(2.3), (or trimethyl ethylene glycol) $((CH_3)_2.C(OH).CHOH.CH_3$ B. P. 177° C.) together with 2 grams of water vapor and about 10 cc. of an inert gas such as carbon dioxide in the span of 20 minutes. There resulted 7.1 grams of 2-methyl butadiene or isoprene (B. P. 32–33°) corresponding to a 92% conversion in one pass. In the residual portion of distillate little or no unacted upon trimethyl ethylene glycol could be detected but in its stead about 1 gram of the halfway dehydrated product, isopropenyl methyl carbinol, was detected.

Example 5

Example 4 was repeated in all details save that for the trimethyl ethylene glycol was now substituted 10 grams of 2-methyl butane diol-(2.4) or αα-dimethyl trimethylene glycol $((CH_3)_2C(OH).CH_2.CH_2OH)$ (B. P. 202-3° C.).

There resulted about 7.3 grams of isoprene corresponding to about 94% conversion in one pass.

Example 6

Again Example 4 was repeated in all detail save that here was introduced 10 grams of pentane diol-(2.4) or αα'-dimethyl trimethylene glycol (B. P. 197–8° C.) (CH₃.CHOH.CH₂.CHOH.CH₃). There resulted 6.1 grams of pentadiene -(1.3) or 1-methyl butadiene (piperylene) B. P. 42–44° C. corresponding to 93% conversion in one pass.

Example 7

Example 4 was now repeated using a closely similar compound to that recorded in Example 5. Here were introduced 10 grams of pentane diol-(1.4) or γ-pentylene glycol (CH₃.CHOH.CH₂.CH₂.CH₂OH)

B. P. (713 mm.) 219–220° C. Practically the same conversion to piperylene was recorded here as in Example 6.

Example 8

Example 4 was again repeated in all detail save that here was introduced 10 grams of hexane diol-(2.5) or α,α'-dimethyl tetramethylene glycol (CH₃.CHOH.CH₂.CH₂.CHOH.CH₃) B. P. 212–215° C. There resulted 6.1 grams of hexadiene-(2.4) or dipropenyl B. P. 87° C. corresponding to an 88% conversion in one pass.

Example 9

Example 8 was repeated substituting 10 grams of a closely related compound hexane diol-(3.4) or α,α' diethyl ethylene glycol (CH₃.CH₂.CHOH.CHOH.CH₂.CH₃)

B. P. 233–4° C. and raising the temperature of furnace to 250° C. The yield of dipropenyl was practically identical with that in Example 8.

Example 10

Here again a closely related compound to those in Examples 8 and 9 was employed, namely 10 grams of hexane diol-(2.4) or α methyl-α'-ethyl trimethylene glycol (CH₃.CH₂.CHOH.CH₂.CHOH.CH₃)

B. P. (750 mm.) 210–11° C. and at a furnace temperature of 240° C. The yield of dipropenyl was here likewise practically the same as in Examples 8 and 9.

Example 11

Example 4 was again repeated but at temperature of furnace at 220° C. There was now introduced 10 grams of 2-methyl pentane diol-(2.4) or α,α,α'-trimethyl trimethylene glycol ((CH₃)₂.C(OH).CH₂.CHOH.CH₃)

B. P. (740 mm.) 190–194° C. There resulted 6.3 grams of 1,3-dimethyl butadiene (1.3) or 2-methyl pentadiene-(1.3), (CH₂:C(CH₃).CH:CH(CH₃))

B. P. 76–77° C. corresponding to 91% conversion in one pass.

Example 12

Example 11 was repeated now but at 250° C. and here introduced the vapors of 10 grams of hexane diol-(1.4) or α-ethyl tetramethylene glycol (CH₃.CH₂.CHOH.CH₂.CH₂.CH₂OH) B. P. (18.5 mm.) 134–5° C. There resulted 6.4 grams of 1-ethyl butadiene or hexadiene-(1.3)

CH₃.CH₂.CH:CH.CH:CH₂)

B. P. 72–4° C. corresponding to 92% conversion in one pass.

Throughout the experiments reported above, substitution of one nonreactive gas for another was found to be perfectly feasible. Indeed the amines and imines reported in the William J. Hale and Harry Miller application, Serial No. 457,478, filed September 5, 1942 now Patent 2,400,409, were often found beneficial although not especially needed in the examples cited above.

While for purposes of illustration specific examples of this process and preferred catalyst have been given, it is not intended that the invention be limited to these examples, as it is believed obvious that changes can be made by one skilled in the art without exceeding the spirit of the invention or the scope of the claim.

I claim:

A process for dehydrating pinacol comprising contacting vapors of pinacol, diluted with 15–25% by volume of water vapor and 1–5 times its volume of a nonreactive gas, with an especially prepared catalyst comprising a skeletal core of aluminum which is coated on particles of granular carborundum of approximately 10 mesh, and extends within the interstices of polyacid anions formed by the reaction at raised temperatures of silicic acid and tungstic anhydride, said catalyst being in the form of pellets which retain their original shape and pour freely.

WILLIAM J. HALE.

REFERENCES CITED

The following references are of record in the file of this patent:

UNITED STATES PATENTS

| Number | Name | Date |
|---|---|---|
| 1,844,998 | Wietzel et al. | Feb. 16, 1932 |
| 1,853,711 | Larson | Apr. 12, 1932 |
| 1,944,153 | Cunradi | Jan. 23, 1934 |
| 2,241,792 | Reppe et al. | May 13, 1941 |

FOREIGN PATENTS

| Number | Country | Date |
|---|---|---|
| 55,394 | Austria | Sept. 10, 1912 |